United States Patent
Lee et al.

(10) Patent No.: US 6,275,890 B1
(45) Date of Patent: Aug. 14, 2001

(54) LOW LATENCY DATA PATH IN A CROSS-BAR SWITCH PROVIDING DYNAMICALLY PRIORITIZED BUS ARBITRATION

(75) Inventors: William Robert Lee, Apex; David Wallach, Raleigh, both of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/136,595

(22) Filed: Aug. 19, 1998

(51) Int. Cl.$^7$ .............................. G06F 13/00; G06F 13/38
(52) U.S. Cl. .............................. 710/131; 710/35; 710/36; 710/37; 710/38; 710/39; 710/40; 710/129; 710/130; 710/132; 712/1; 712/16; 712/20; 712/29; 712/30
(58) Field of Search ...................................... 710/131, 132, 710/129, 35, 36, 37, 38, 39, 40, 130; 712/20, 16, 29, 30, 1

(56) References Cited

U.S. PATENT DOCUMENTS

| | | |
|---|---|---|
| 4,014,005 * | 3/1977 | Fox et al. ........................ 340/172.5 |
| 4,148,011 | 4/1979 | McLagan et al. . |
| 4,818,985 | 4/1989 | Ikeda . |
| 4,987,529 | 1/1991 | Craft et al. . |
| 5,148,545 | 9/1992 | Herbst . |
| 5,191,656 | 3/1993 | Forde, III et al. . |
| 5,197,130 * | 3/1993 | Chen et al. ................................. 712/3 |
| 5,339,396 * | 8/1994 | Muramatsu et al. ................... 709/200 |
| 5,404,538 | 4/1995 | Krappweis . |
| 5,467,295 | 11/1995 | Young et al. . |
| 5,471,590 | 11/1995 | Melo et al. . |
| 5,506,998 * | 4/1996 | Kato et al. ................................. 712/1 |
| 5,528,767 | 6/1996 | Chen . |
| 5,555,425 | 9/1996 | Zeller et al. . |
| 5,555,543 * | 9/1996 | Grohoski et al. .................... 370/58.1 |
| 5,572,734 | 11/1996 | Narad et al. . |
| 5,588,152 * | 12/1996 | Dapp et al. ............................. 712/1 |
| 5,596,729 | 1/1997 | Lester . |
| 5,689,657 | 11/1997 | Desor et al. . |
| 5,805,821 * | 9/1998 | Saxena et al. ....................... 709/231 |
| 5,896,516 * | 4/1999 | Powell, Jr. et al. ................. 710/132 |
| 5,959,689 * | 9/1999 | De Lange et al. ................... 348/571 |

* cited by examiner

*Primary Examiner*—Ayaz Sheikh
*Assistant Examiner*—Frantz B Jean
(74) *Attorney, Agent, or Firm*—Joseph A. Sawyer, Jr.

(57) ABSTRACT

The present invention provides a cross-bar switch which includes a plurality of master bus ports, the master bus ports adapted to receive a plurality of master buses; a plurality of slave bus ports, the slave bus ports adapted to receive a plurality of slave buses; a manner of switching for selectively coupling the plurality of master bus ports to the plurality of slave bus ports; and a manner of configuration for prioritizing access requests by the plurality of master buses to the plurality of slave buses via the switching means. The cross-bar switch of the present invention has the capability of prioritizing requests between multiple parallel high speed buses. In a preferred embodiment, this arbitration is accomplished through Configuration Registers on the cross-bar switch. The Configuration Registers are programmable through the Device Control Register bus, which allows the cross-bar switch to be dynamically programmed and changed by a processor in a larger system. The cross-bar switch of the present invention minimizes the latency between data transfers. This improves the bandwidth and throughput on the on-chip bus.

12 Claims, 8 Drawing Sheets

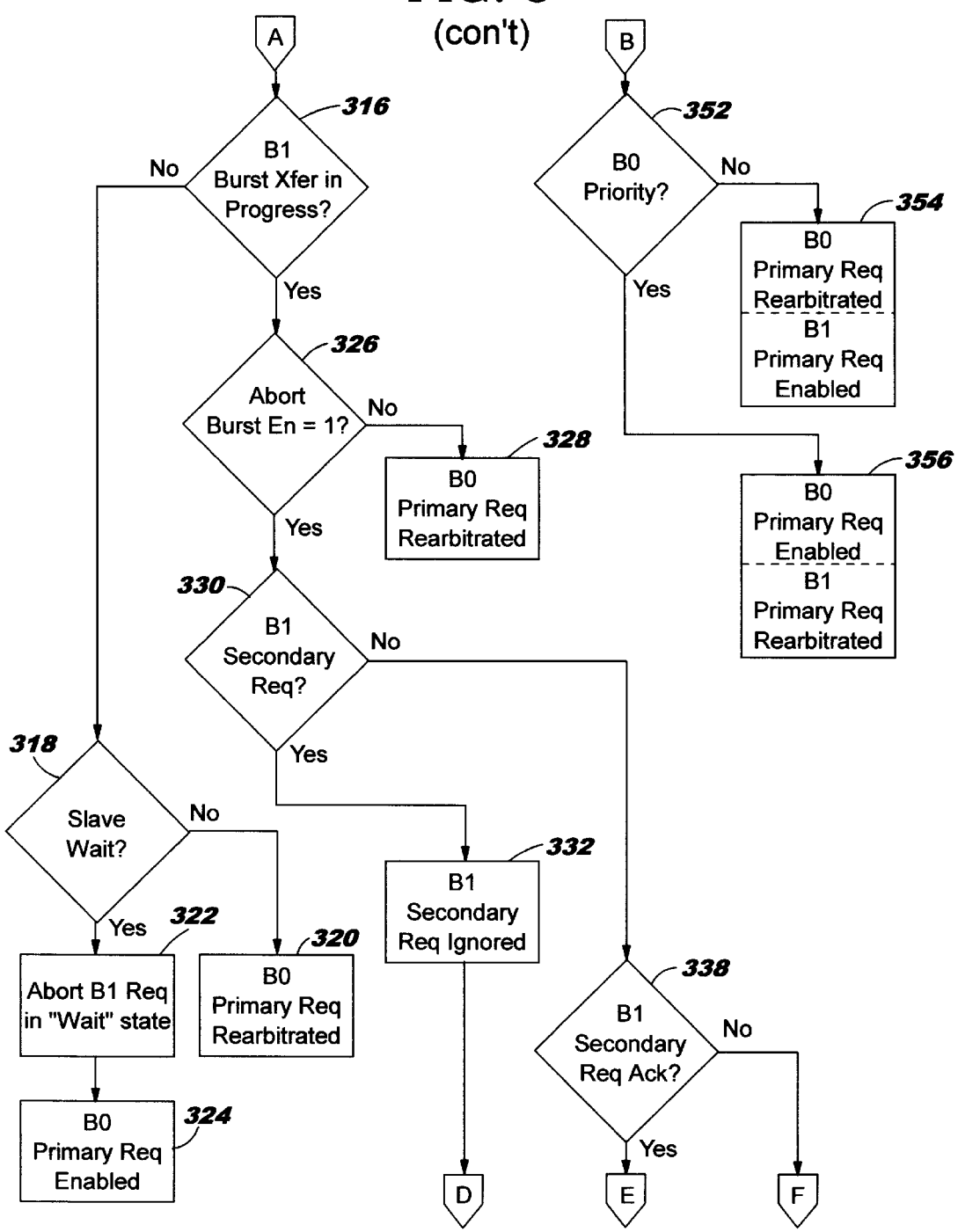
FIG. 3 (con't)

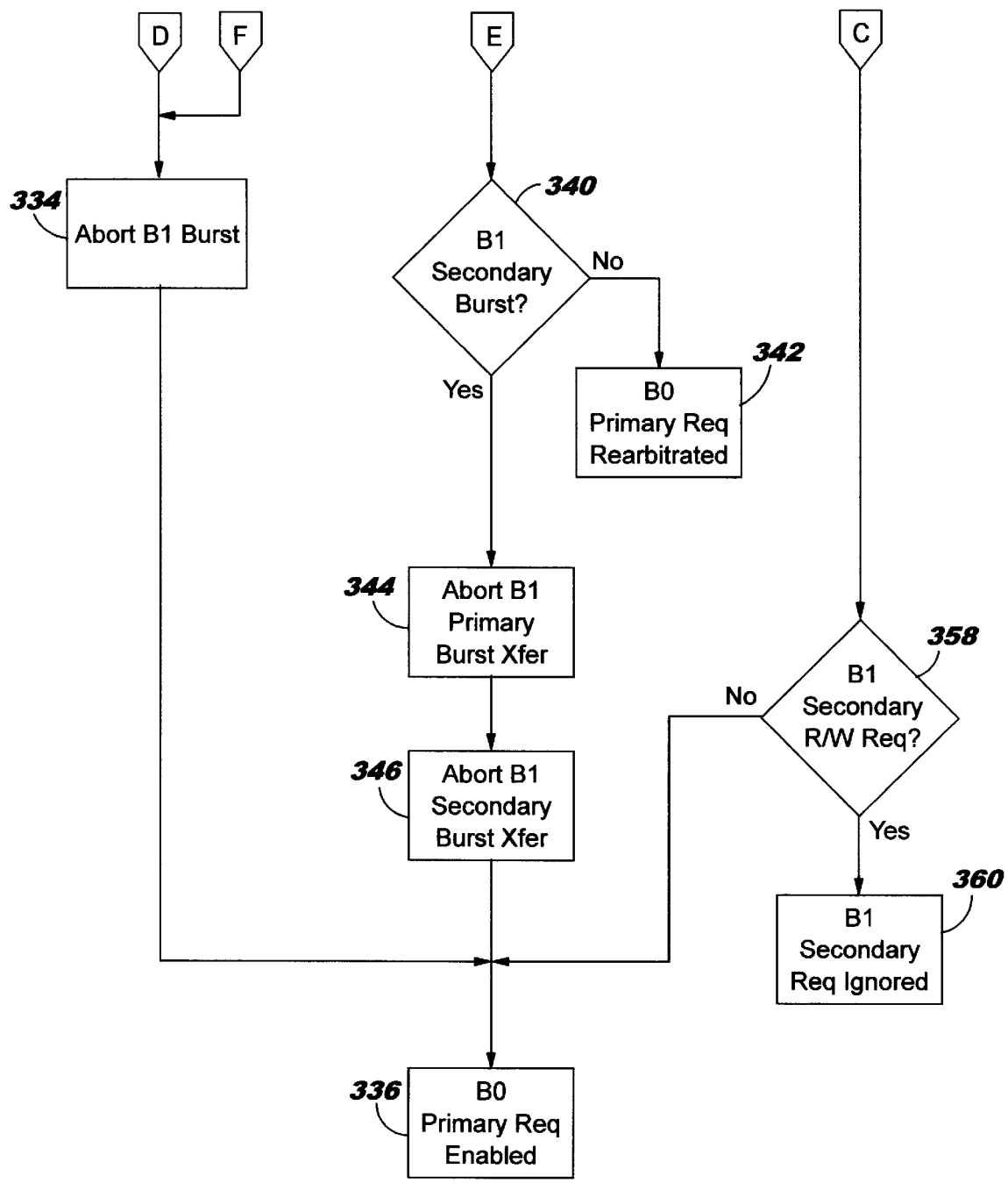
FIG. 3 (con't)

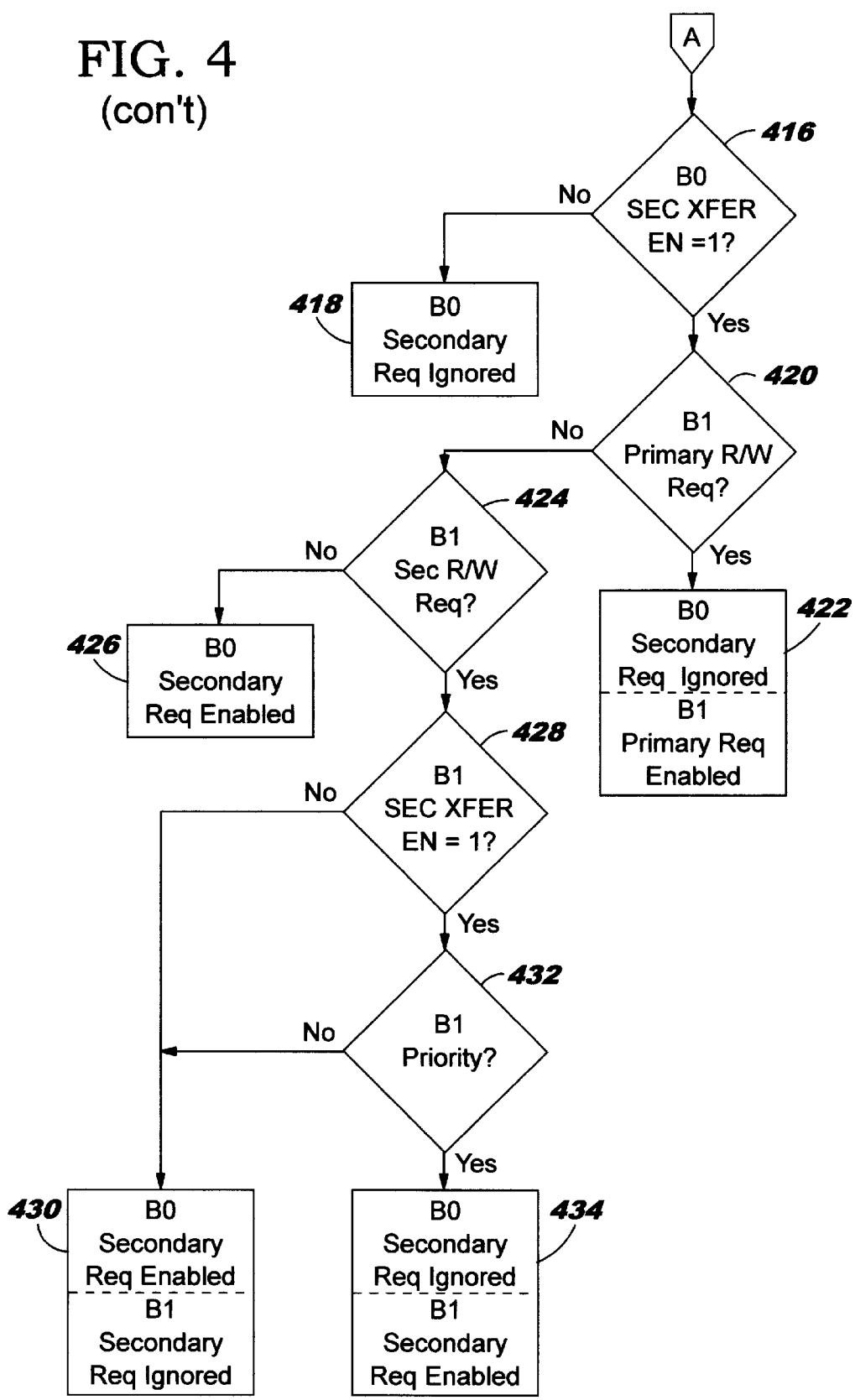
FIG. 4 (con't)

(con't)

LOW LATENCY DATA PATH IN A CROSS-BAR SWITCH PROVIDING DYNAMICALLY PRIORITIZED BUS ARBITRATION

FIELD OF INVENTION

The present invention relates to bus arbitration in computer systems, and more specifically to the prioritization of bus arbitration in a cross-bar switch.

BACKGROUND

Significant advances in silicon densities have allowed for the integration of many functions onto a single silicon chip. With this increased density, many of the peripherals in a computer system that were normally attached to the processor via an external bus now are attached via a on-chip bus. In addition, the bandwidth requirements of these on-chip buses are increasing due to the integration of various audio, video, and graphic functions along with the processor. As a result, achieving maximum on-chip bus performance is a concern.

FIG. 1 illustrates a conventional on-chip bus architecture 100 containing a on-chip bus 120 and bus arbiter 140. The on-chip bus 120 supports read and write data transfers between master devices 110 and slave devices 130 equipped with a on-chip bus interface. A "master" device is one which requests access to or control of the on-chip bus 120 and transmits and receives data across the on-chip bus 120. A "slave" device is one which transmits or receives data across the on-chip bus 120 and is responsive to a master. The slave may not request access to or control of the on-chip bus 120. Access to the on-chip bus 120 is granted through an arbitration mechanism 140, or arbiter, which is attached to the on-chip bus 120 and prioritizes all transfer requests from master device for bus ownership. Timing for all on-chip bus signals is provided by a single clock source (not shown). This single clock source is shared by all master devices and slave devices attached to the on-chip bus 120. The master devices may operate at a different (higher) frequency. Synchronization logic may be implemented at the interface of the two clock domains.

One approach to increasing the performance of the on-chip bus is to use multiple parallel high speed buses instead of a single bus as illustrated in FIG. 1. A mechanism, such as a conventional cross-bar switch, is typically utilized to allow these buses to communicate with each other. However, conventional mechanisms do not prioritize requests from different master buses. The conventional cross-bar switches do not provide for arbitration between the buses. Since each bus contains its own arbiter for arbitrating only the master device attached to that bus, this would significantly limit the efficiency of the system.

Accordingly, there exists a need for a method and system for prioritizing requests between multiple parallel high speed buses. This method should minimize the latency between data transfers to and from master devices with the highest priority. The present invention addresses such a need.

SUMMARY

The present invention provides a cross-bar switch which includes a plurality of master bus ports, the master bus ports adapted to receive a plurality of master buses; a plurality of slave bus ports, the slave bus ports adapted to receive a plurality of slave buses; a manner of switching for selectively coupling the plurality of master bus ports to the plurality of slave bus ports; and a manner of configuration for prioritizing access requests by the plurality of master buses to the plurality of slave buses via the switching means. The cross-bar switch of the present invention has the capability of prioritizing requests between multiple parallel high speed buses. In a preferred embodiment, this arbitration is accomplished through Configuration Registers within the cross-bar switch. The Configuration Registers are programmable through a secondary Device Control Register bus, which allows the cross-bar switch to be dynamically programmed and changed by a processor in a larger system. The cross-bar switch of the present invention minimizes the latency between data transfers to and from master devices with the highest priority. This improves the bandwidth and throughput on the on-chip bus.

DETAILED DESCRIPTION OF THE INVENTION

The present invention provides a method and system for arbitrating requests across a cross-bar switch interfaced with multiple parallel buses. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the present invention, please refer to FIGS. 2 through 4 and the discussion below.

Figure 1:
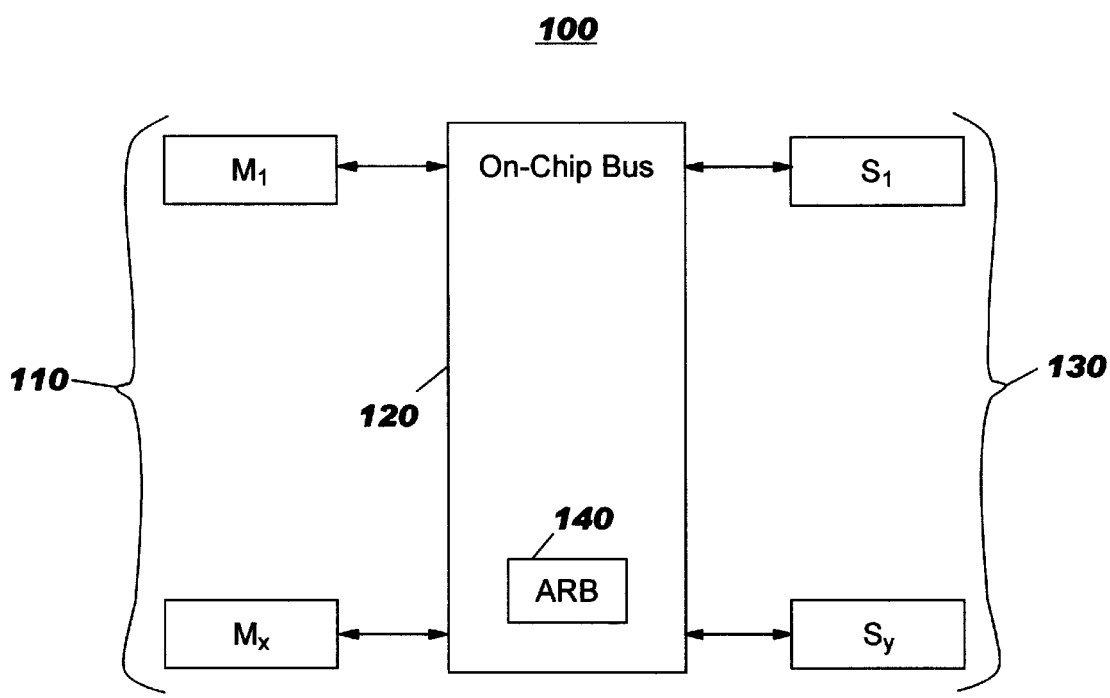
FIG. 1 is a block diagram of a conventional on-chip bus architecture.
Figure 2:
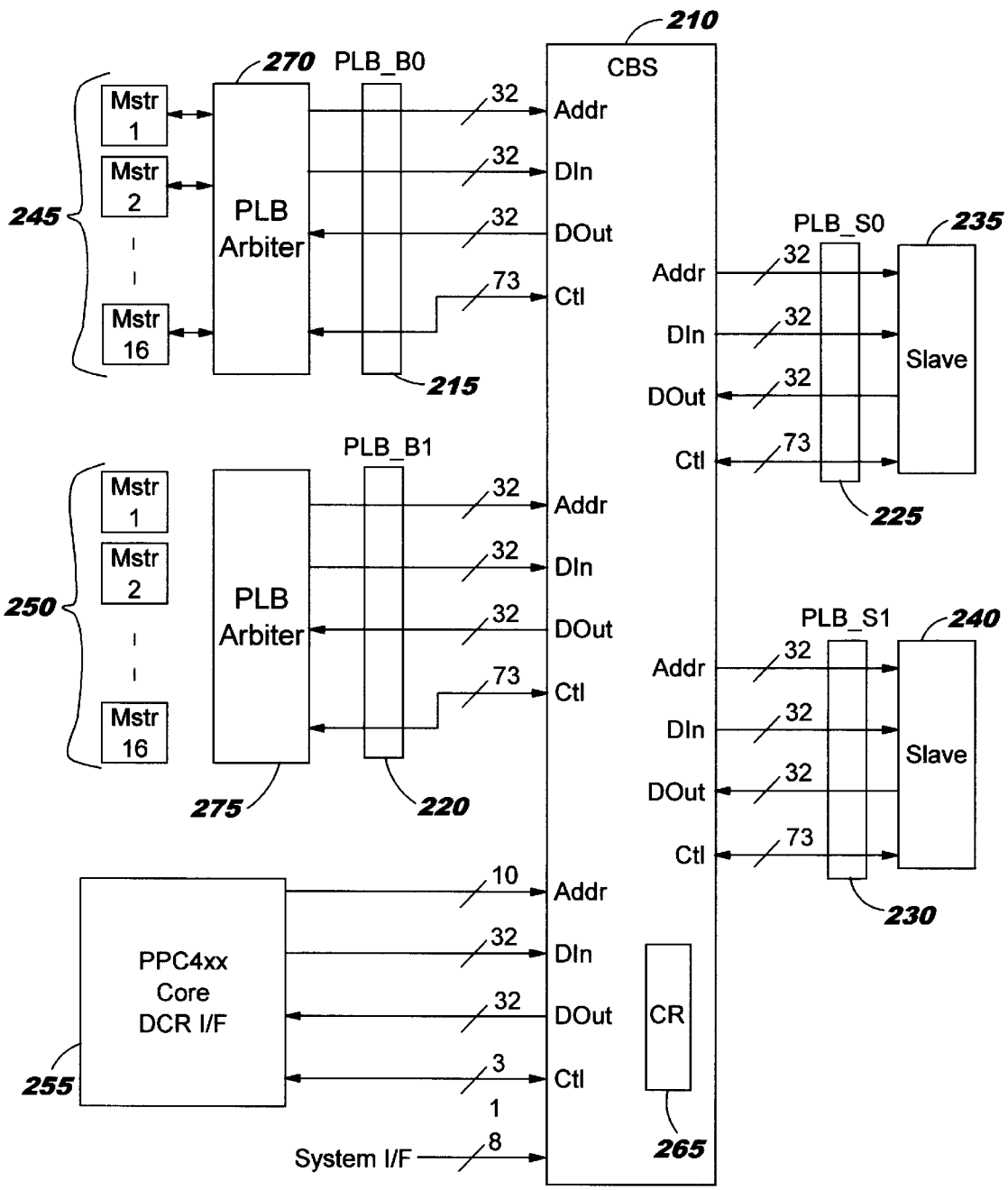
FIG. 2 is a block diagram of a cross-bar switch architecture in accordance with the present invention.

FIG. 2 illustrates a preferred embodiment of a cross-bar switch interface on a chip 200 for a method and system in accordance with the present invention. In this embodiment, the cross-bar switch (CBS 210) is a PowerPC Local Bus CBS 210 operating generally under the conventional PowerPC Local Bus (PLB) protocol, however, any CBS 210 architecture may be used. The PLB protocols are known in the art and will not be discussed in detail in this specification. The preferred embodiment of the method in accordance with the present invention expands upon the PLB protocol.

The CBS 210 connects multiple parallel master buses 215 and 220 (PLB_B0 and PLB_B1 respectively), to multiple slave buses 225 and 230 (PLB_S0 and PLB_S1 respectively). Each master bus 215, 220 is managed by its own arbiter 270, 275. Interfaced with each arbiter 270, 275 are a plurality of master devices 245, 250. An arbiter prioritizes read/write requests which are asserted by the master devices interfaced with it. For example, arbiter 270 prioritizes read/write requests from any of the master devices 245 while arbiter 275 prioritizes requests from any of the master devices 250. Also interfaced with the CBS 210 is a 32-bit Device Control Register (DCR) bus 255. The DCR bus is used to move data between the CPU's General Purpose Registers (GPRs) and the CBS 210 Device Control Registers.

Although the preferred embodiment shows two master buses and two slave buses, one of ordinary skill in the art will understand that any number of slave buses and parallel master buses may be used without departing from the spirit and scope of the present invention. For purposes of describing the features of the present invention, a bus architecture with two master buses and two slave buses will be used.

The CBS 210 allows the master buses 215, 220 to inter-communicate with the slave buses 225, 230. The CBS 210 decodes the address and/or transfer type on the master buses 215, 220 and directs the transfer to the appropriate slave device. The CBS 210 allows all master devices connected to master bus 215 to request all transfer types from the slave devices on either slave bus 225 or slave bus 230. Similarly, all master devices attached to master bus 220 can request all transfer types from slave devices on either slave buses 225 or 230. Simultaneous data transfers can occur between each master bus and each slave bus.

Each master may make two types of read/write data transfer requests, a primary transfer request and a secondary pipelined transfer request. A primary request is one for which a bus transfer is started while the requested data bus is idle. A secondary request is one for which a bus transfer is started before a current bus transfer (primary) in the same direction is completed.

A problem occurs when two master devices who are attached to different master buses simultaneously initiate transfer requests to the same slave bus. These requests are not prioritized. This is due to the fact that the arbitration mechanisms 270, 275 are stand-alone devices which do not communicate with each other. Thus, high priority requests from one master bus may be forced to wait until lower priority requests from another master bus have concluded before their requests are processed. This results in more important requests being delayed unnecessarily.

To allow the use of multiple parallel high speed buses in the on-chip bus architecture while also maintaining the prioritization of data requests available under the conventional architecture, the method of the present invention utilizes a CBS 210 which contains Configuration Registers 265. The Configuration Registers 265 are set to allow for prioritization of requests from different master buses to the same slave bus. The CBS 210 examines the Configuration Registers 265 when determining which transfer request has priority for ownership of the slave bus. The Configuration Registers 265 are programmable through the DCR 255. The DCR 255 interface allows the CBS 210 to be dynamically programmed and changed by a processor in a larger system.

In a preferred embodiment of the Configuration Registers 265 of the present invention, three control bits are used: the Priority Control Bit, the Transfer Abort Control Bit, and the Secondary Pipelined Transfer Request Enable.

The Priority Control Bit is used to prioritize master buses 215 and 220. It is used in the arbitration of the slave bus access when simultaneous transfer requests are initiated. For this control bit each master bus must assert read transfer requests or each must assert write transfer requests. When there is a simultaneous request from both master buses to the same slave bus, whether the requests are the same (i.e. both reads or both writes) or different (read/write or write/read) only one transfer is allowed through. It is only when a master bus is in progress with a transfer (i.e. request address acknowledged by slave device) that the other master can initiate a transfer of the other type, i.e. read when write is in progress or vice versa. In the preferred embodiment, generally, if the Priority Control Bit is set to "0", i.e., not enabled, then the request from master bus 215 has priority during simultaneous or burst-type requests and is processed while the request from master bus 220 is rearbitrated by the CBS 210 and its arbitration mechanism 275. Rearbitration refers to the process of the slave device (CBS 210) bus indicating to the arbiter through the assertion of a "rearbitrate" signal that it is unable to perform the currently requested transfer and requires the request to be sent back to the arbiter to be reprioritized and reissued. If the Priority Control bit is set to "1", i.e., enabled, then the request from master bus 220 has priority during simultaneous or burst type requests and is processed while the request from master bus 215 is rearbitrated.

Although the Priority Control Bit of the preferred embodiment of the Configuration Registers 265 of the present invention is described as comprising one bit, one of ordinary skill in the art will understand that it can comprise more than one bit without departing from the spirit and scope of the present invention.

The Transfer Abort Control Bit is used in conjunction with the Priority Control Bit to enable the CBS 210 to abort lower-priority burst-type transfers which may be in progress when the higher priority master bus is initiating a transfer request. In the preferred embodiment, programming the Transfer Abort Control Bit to a "1" will enable the CBS 210 to perform the abort. This will prevent the need for requests from higher priority master buses to wait until lengthy lower-priority burst-transfer conclude before obtaining ownership of the bus.

The Secondary Pipelined Transfer Request Enable is a bit used to enable/disable address-pipelined secondary transfer requests initiated by a master device attached to the master buses 215 and 220 to slave buses 225 and 230 which are currently not servicing the primary transfer request in progress. In the preferred embodiment, a "1" bit enables while a "0" bit disables. Separate Secondary Pipelined Transfer Enable bits are implements for each master bus port 215 and 220. For example, assume slave bus 225 is busy processing a Primary transfer request from master bus 215 and then master bus 215 initiates a secondary transfer request. If the Secondary Pipelined Transfer Request bit for master bus 215 is enabled, the CBS 210 will allow the secondary transfer request to be sent to either slave bus 225 or 230 (assuming all conditions are met). When the secondary pipelined transfer request bit is disabled, the CBS 210 will not allow the transfer to the slave bus not servicing the primary transfer request. For example, master bus 215 is busy with a primary transfer request to slave bus 225. Master bus 215 then initiates a secondary transfer request to slave bus 230. The CBS 210 will rearbitrate this request since slave bus 230 is not servicing the primary request. However, if the secondary request was initiated to slave bus 225, the CBS 210 will allow the transfer to occur. The reason for doing this is to prevent a secondary pipelined transfer request from blocking primary requests initiated by the other master buses to the slave bus not servicing a primary request.

A second preferred embodiment of the Configuration Registers 265 in accordance with the present invention has a fourth Bus Lock Bit in addition to the three described above. The features of the Bus Lock Bit is disclosed in co-pending U.S. patent application entitled "Dynamic Bus Arbitration Priority Selection in a Cross-Bar Switch," Ser. No. 09/136,023. Applicant hereby incorporates this patent application by reference. Under PLB protocols, when a master bus initiates a Bus Lock transfer, all of the slave buses would be locked once all conditions are met. However, under the second embodiment of the present invention, if a master initiates a Bus Lock transfer to a slave, the slave bus will be locked and access by the other master buses will not occur until the Bus Lock transfer has concluded. The other slave bus is not locked until the master initiates a bus lock transfer request to a slave attached to it. When the bus lock transfer bit is enabled, all slave buses will be locked during the initial bus lock transfer request, once conditions are met. This will lock out all other master bus requests until the master initiating the bus lock negates the bus lock signal. When the bus lock transfer bit is disabled, only the slave bus to which the initial request was sent will be locked. Transfer requests from other master buses to slave buses not servicing the initial bus lock transfer will still occur and not be locked out. The Bus Lock Bit provides flexibility in locking one or more slave buses, minimizing latency between data transfers.

Although the present invention has been described with a Configuration Register with 3 and 4 configuration bits, any number of bits may be used without departing from the spirit and scope of the present invention.

Figure 3:
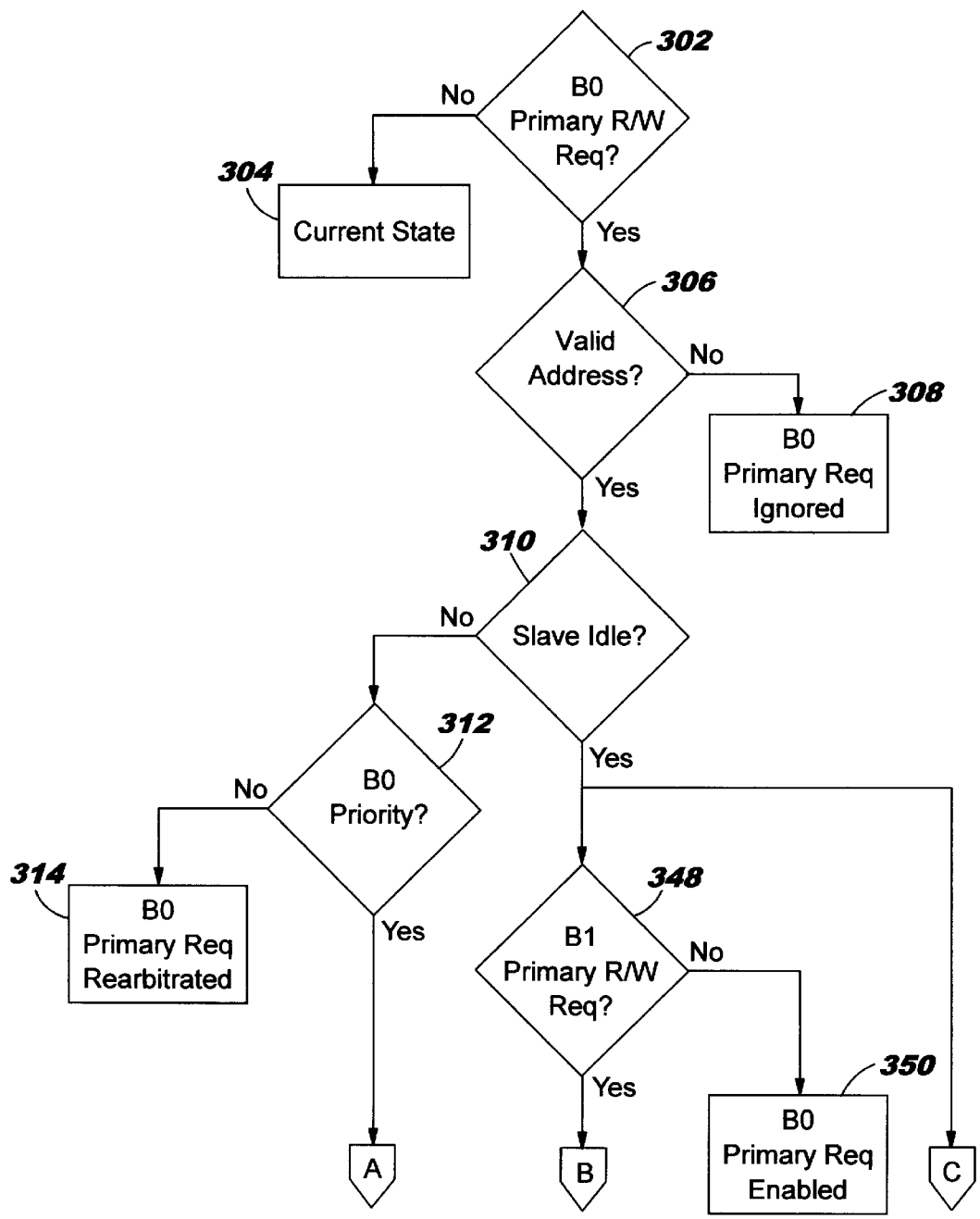
FIG. 3 is a flow chart illustrating a preferred embodiment of the arbitration protocols in accordance with the present invention when a master bus initiates a primary request.
Figure 4:
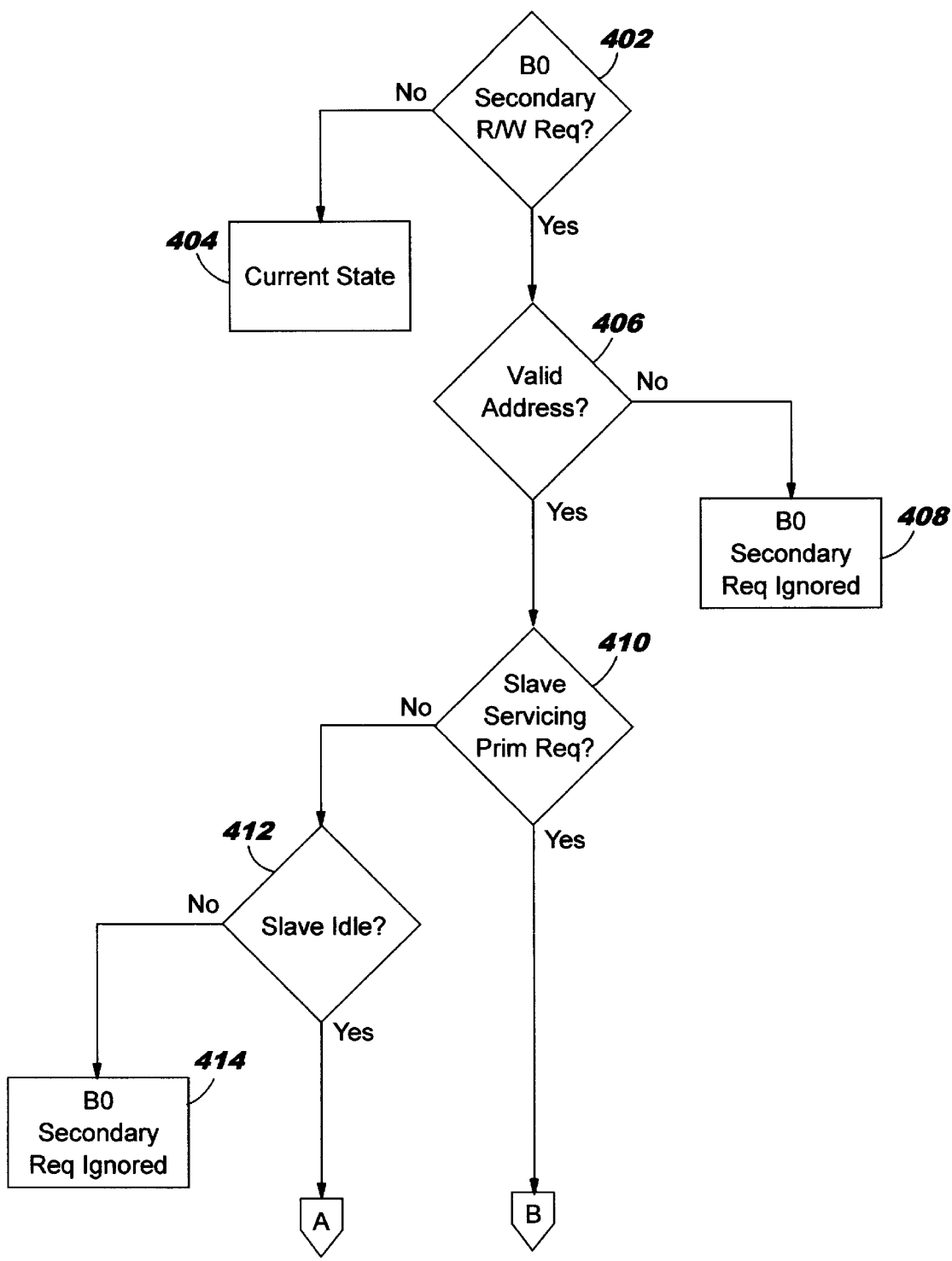
FIG. 4 is a flow chart illustrating a preferred embodiment of the arbitration protocols in accordance with the present invention when a master bus initiates a pipelined secondary request.
Figure 4:
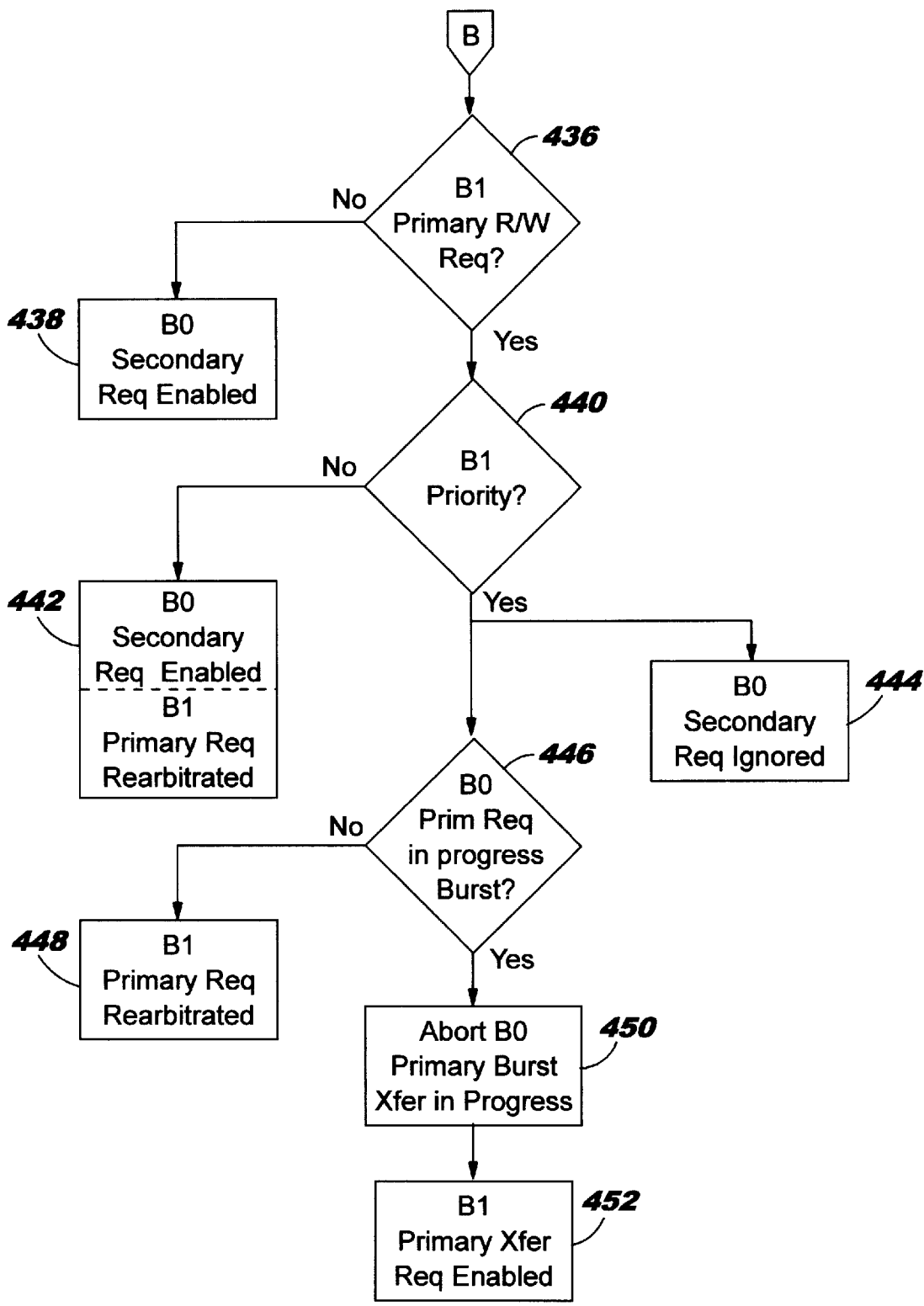

FIGS. 3 and 4 are flow charts which illustrate the preferred embodiment of the prioritization protocols of the method in accordance with the present invention. FIG. 3 is a flow chart illustrating a preferred embodiment of the arbitration protocols when the master bus 215 initiates a primary request to the same slave bus 225 or 230 as master bus 220. If there is no valid read/write request initiated, then the slave bus will continue in its current state, via step 304. If master bus 215 initiates a primary read/write request, and the request contains a valid address, via step 306, then the CBS 210 checks to see if the slave bus is idle, via step 310. If it is not, then the CBS 210 checks whether master bus 215 has priority over the current request based on the Priority Control Bit, via step 312. If not, then master bus 215's primary request is rearbitrated, via step 314. To prompt the rearbitration, the CBS 210 acts like a slave device and asserts the slave rearbitrate signal to the arbiter 270 which initiated the request.

If master bus 215 does have priority, via step 312, then the CBS 210 checks if the slave bus is busy with a burst-type transfer asserted by master bus 220. If not, then the current request in progress cannot be aborted unless the slave bus has only asserted a "wait" signal for master bus 220's request.

The CBS 210 thus checks if the slave bus has asserted the "wait" signal, via step 318. The "wait" signal is asserted to indicate that the slave bus has recognized the valid address but is unable to latch the address and all of the transfer qualifiers at the end of the current clock cycle. When a "wait" signal is asserted for a Primary request, the arbiter disables the address cycle time-out mechanism and will wait indefinitely for the slave to respond with an address acknowledge or a master device abort of the requested transfer. In the context of the present invention, if it is asserted by the slave busy with the current transfer, then the current transfer will be aborted to allow the higher priority request to be serviced. While the transfer is being aborted, the CBS 210 will block the newly requested transfer until the abort completes and the transfer request can be sent to the slave.

If the slave has not asserted the "wait" signal, then the master bus 215's primary request is rearbitrated since the current transfer in progress cannot be aborted via step 320. Otherwise, the CBS 210 will abort the request by master bus 220 which is in the "wait" state, via step 322, and enable master bus 215's primary request, via step 324.

If the slave bus is currently servicing a burst-type transfer for master bus 220, the status of the Transfer Abort Control bit is checked, via step 326. If it is a "1", i.e., not enabled, then the primary request of master bus 215 is rearbitrated, via step 328. If it is a "1", i.e., enabled, then the CBS 210 determines whether or not the request asserted by master bus 220 is a primary or secondary transfer request, via step 330. If it is a secondary request, then master bus 220's secondary transfer request is ignored, via step 332, and the burst-type transfer in progress on the slave bus is aborted, via step 334. Then, the primary transfer request by master bus 215 is enabled, via step 336. If it is a primary transfer request, then the CBS 210 checks whether or not master bus 220 has followed it with a secondary request which has been acknowledged by the slave device, via step 338. Acknowledgement means that the slave bus has received the transfer request, decoded the address, and responded with an address acknowledge. If the slave bus has not acknowledged the address, then the current burst-type transfer is aborted, via step 334, and the master bus 215's primary request is enabled, via step 336.

If master bus 220's following secondary request has been acknowledged, the CBS 210 checks whether the request is a burst-type transfer, via step 340. If not, then the acknowledged request cannot be aborted, and master bus 215's primary transfer request is rearbitrated, via step 342. If it is a burst-type transfer, then the current primary burst transfer in progress by master bus 220 is aborted, via step 344. Also aborted is the secondary burst-type transfer initiated by master bus 220, via step 346. Then, the primary request by master bus 215 is enabled, via step 336.

Returning to step 306, if after the CBS 210 checks for a valid address, it determines that the slave bus is idle, via step 310, it checks if the request by master bus 220 is a primary read/write request, via step 348, or a secondary read/write request, via step 358. If it is a primary read/write request, then it checks if master bus 215 has priority according to the Priority Control Bit, via step 352. If so, then the primary request asserted by master bus 215 is enabled while the primary request asserted by master bus 220 is rearbitrated, via step 356. If it does not have priority, then the primary request by master bus 215 is rearbitrated while the primary request by master bus 220 is enabled, via step 354.

If the request by master bus 220 is a secondary request, via step 358, then the secondary request by master bus 220 is ignored, via step 360. Master Bus 215 is enabled as long as there is no primary request from master bus. If not, then the primary request by master bus 215 is enabled, via step 336. The master bus 220 secondary request is ignored and will time out.

FIG. 4 is a flow chart illustrating the preferred embodiment of the arbitration protocols when the master bus 215 initiates a secondary request to the same slave bus as master bus 220. If there is no valid read/write request, then the slave bus is left at its current state, via step 404. If the master bus 215 initiates a secondary read/write request to a slave bus which has an invalid address, via step 406, then the secondary request is ignored, via step 408. Otherwise, the CBS 210 determines whether the slave bus is currently servicing a primary transfer request, via step 410. If not, and the slave bus is not idle (i.e., the slave bus is currently servicing a transfer request), via step 412, then the secondary request of master bus 215 is ignored, via step 414. If the slave is idle, via step 412, then the CBS 210 checks if master bus 215's Secondary Pipelined Transfer Request Enable Bit is enabled, via step 416. If it is not enabled, then the secondary request by master bus 215 is ignored, via step 418 since slave is not servicing primary request. If it is enabled, then the CBS 210 checks if master bus 220 is initiating a primary read/write request, via step 420. If so, then the secondary request by master bus 215 is ignored while the primary request by master bus 220 is enabled, via step 422.

If master bus 220 is not requesting a primary read/write, via step 420, then the CBS 210 determines master bus 220 is initiating a secondary read/write request, via step 424. If not, then the secondary request by master bus 215 is enabled, via step 426. If it is, then the CBS 210 checks if the Secondary Pipelined Transfer Request Enable Bit for master bus 220 is enabled, via step 428. If it is not enabled, then the secondary request by master bus 215 is enabled while the secondary request by master bus 220 is ignored, via step 430 since master bus 220 secondary transfer request is to slave bus not servicing master bus 220 primary request and master bus 220 secondary transfer request enable bit is disabled. If the Secondary Pipelined Transfer Request Enable Bit is enabled, then the CBS 210 determines if master bus 220 has priority based on the Priority Control Bit, via step 432. If it does not, then the secondary request by master bus 215 is enabled while the secondary request by master bus 220 is ignored, via step 430. If master bus 220 does have priority, via step 432, then the secondary request by master bus 215 is ignored while the secondary request by master bus 220 is enabled, via step 434.

Returning to step 410, if the slave is servicing a primary request, via step 410, then the CBS 210 determines if the master bus 220 is requesting a primary read/write, via step 436. If not, then the secondary request by master bus 215 is enabled, via step 438. If so, then the CBS 210 determines if master bus 220 has priority based on the Priority Control Bit, via step 440. If not, then the secondary request by master bus 215 is enabled while the primary request by master bus 220 is rearbitrated, via step 442.

If master bus 220 does have priority, then the secondary request by master bus 215 is ignored, via step 444. At the same time, the CBS 210 determines if the slave is currently processing a primary burst-type transfer initiated by master bus 215 which can be aborted, via step 446. If not, then the primary request by master bus 220 is rearbitrated, via step 448. If so, then the primary burst transfer in progress on master bus 215 is aborted, via step 450. Then the primary transfer request by master bus 220 is enabled, via step 452.

Although the present invention has been described with the use of Configuration Registers to implement priority arbitration on the CBS 210, one of ordinary skill in the art will understand that other methods of indicating priority between master buses can be used without departing from the spirit and scope of the present invention. For example, extra bits may be added to the master ID signal of the PowerPC Local Bus protocol to indicate which master device interfaced with a particular arbiter initiated the request. Priority may thus be assigned based on this extended master ID. This method of assigning priority could also be used in conjunction with the Configuration Registers without departing from the spirit and scope of the present invention.

A method and system for providing a cross-bar switch which has the capability of prioritizing requests between multiple parallel high speed buses has been disclosed. This arbitration is accomplished through Configuration Registers on the Cross-Bar Switch. The Configuration Registers are programmable through the Device Control Register, which allows the Cross-Bar Switch of the present invention to be dynamically programmable and changed by a processor in a larger system. The method and system of the present invention minimizes the cycle latency between data transfers. This improves the bandwidth and throughput on the on-chip bus.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A cross-bar switch comprising:
 a plurality of master bus ports, the master bus ports adapted to receive primary and secondary data transfer requests from a plurality of parallel master buses;
 a plurality of slave bus ports, the slave bus ports adapted to receive data from a plurality of parallel slave buses;
 a switching means for selectively coupling the plurality of master bus ports to the plurality of slave bus ports; and
 configuration registers for prioritizing the primary and secondary data transfer requests by the plurality of parallel master buses to the plurality of parallel slave buses via the switching means, the configuration registers comprising:
   at least one Priority Control Bit which indicates the priorities of the primary and secondary data transfer requests from the plurality of parallel master buses,
   a Transfer Abort Control Bit which enables the abort of a lower-priority burst-type data transfer which may be in progress on a slave bus when a master bus initiates a higher-priority data transfer request to the same slave bus, and
   a Secondary Transfer Request Enable which enables or disables the serving of an address-pipelined secondary transfer request by a slave bus not currently servicing a primary transfer request.

2. The cross-bar switch of claim 1, wherein the plurality of parallel master buses are coupled to a plurality of arbiters, the plurality of arbiters being coupled to a plurality of master devices.

3. The cross-bar switch of claim 1, wherein the plurality of parallel slave buses are coupled to a plurality of slave devices.

4. The cross-bar switch of claim 1, wherein the configuration registers further comprise a Bus Lock Bit which locks access only to the slave bus serving a Bus Lock data transfer request.

5. The cross-bar switch of claim 1, wherein the configuration registers are programmable through a Device Control Register bus coupled to the cross-bar switch.

6. The cross-bar switch of claim 1, wherein the configuration means comprise a master ID which uniquely identifies the master device which asserted the access request.

7. A cross-bar switch comprising:
 a plurality of master bus ports, the master bus ports adapted to receive a plurality of master buses;
 a plurality of slave bus ports, the slave bus ports adapted to receive a plurality of slave buses;
 a switching means for selectively coupling the plurality of master bus ports to the plurality of slave bus ports; and configuration means for prioritizing and arbitrating access requests by the plurality of master buses to the plurality of slave buses via the switching means, wherein the configuration means comprises Configuration Registers, wherein the Configuration Registers comprise:

at least one Priority Control Bit;

a Transfer Abort Control Bit, wherein the Transfer Abort Control Bit enables the abort of a lower-priority burst-type access which may be in progress on a slave bus when a higher priority master bus initiates an access request to the same slave bus to minimize cycle latency of high priority requests; and a Secondary Transfer Request Enable.

8. A cross-bar switch comprising:

a plurality of master bus ports, the master bus ports adapted to receive a plurality of master buses;

a plurality of slave bus ports, the slave bus ports adapted to receive a plurality of slave buses;

a switching means for selectively coupling the plurality of master bus ports to the plurality of slave bus ports; and configuration means for prioritizing and arbitrating access requests by the plurality of master buses to the plurality of slave buses via the switching means, wherein the configuration means comprises Configuration Registers, wherein the Configuration Registers comprise:

at least one Priority Control Bit;

a Transfer Abort Control Bit; and a Secondary Transfer Request Enable, wherein the Secondary Transfer Request Enable enables or disables the servicing of a lower-priority address-pipelined access request by a slave bus not currently servicing a higher-priority access request.

9. A cross-bar switch comprising:

a plurality of master bus ports, the master bus ports adapted to receive a plurality of master buses;

a plurality of slave bus ports, the slave bus ports adapted to receive a plurality of slave buses;

a switching means for selectively coupling the plurality of master bus ports to the plurality of slave bus ports; and configuration registers for prioritizing data transfer requests by the plurality of master buses to the plurality of slave buses via the switching means, the configuration registers comprising:

at least one Priority Control Bit, a Transfer Abort Control Bit, wherein the Transfer Abort Control Bit enables the abort of a lower-priority burst-type data transfer which may be in progress on a slave bus when a master bus initiates a higher-priority data transfer request to the same slave bus, and a Secondary Transfer Request Enable.

10. A cross-bar switch comprising:

a plurality of master bus ports, the master bus ports adapted to receive a plurality of master buses;

a plurality of slave bus ports, the slave bus ports adapted to receive a plurality of slave buses;

a switching means for selectively coupling the plurality of master bus ports to the plurality of slave bus ports; and configuration registers for prioritizing data transfer requests by the plurality of master buses to the plurality of slave buses via the switching means, the configuration registers comprising:

at least one Priority Control Bit, a Transfer Abort Control Bit, and a Secondary Transfer Request Enable, wherein the Secondary Transfer Request Enable enables or disables the servicing of a lower-priority address-pipelined data transfer request by a slave bus not currently servicing a higher-priority data transfer request.

11. A system for providing a cross-bar switch comprising:

means for providing a plurality of master bus ports, the master bus ports adapted to receive a plurality of master buses;

means for providing a plurality of slave bus ports, the slave bus ports adapted to receive a plurality of slave buses;

a switching means for selectively coupling the plurality of master bus ports to the plurality of slave bus ports; and configuration means for prioritizing access requests by the plurality of master buses to the plurality of slave buses via the switching means, wherein the configuration means comprises Configuration Registers, wherein the Configuration Registers comprise:

at least one Priority Control Bit;

a Transfer Abort Control Bit, wherein the Transfer Abort Control Bit enables the abort of a lower-priority burst-type access which may be in progress on a slave bus when a higher priority master bus initiates an access request to the same slave bus; and a Secondary Transfer Request Enable.

12. A system for providing a cross-bar switch comprising:

means for providing a plurality of master bus ports, the master bus ports adapted to receive a plurality of master buses;

means for providing a plurality of slave bus ports, the slave bus ports adapted to receive a plurality of slave buses;

a switching means for selectively coupling the plurality of master bus ports to the plurality of slave bus ports; and configuration means for prioritizing access requests by the plurality of master buses to the plurality of slave buses via the switching means, wherein the configuration means comprises Configuration Registers, wherein the Configuration Registers comprise:

at least one Priority Control Bit;

a Transfer Abort Control Bit; and a Secondary Transfer Request Enable, wherein the Secondary Transfer Request Enable enables or disables the servicing of a lower-priority address-pipelined access request by a slave bus not currently servicing a higher-priority access request.

* * * * *